United States Patent [19]

Baba

[11] 4,089,397

[45] May 16, 1978

[54] CONTROL MECHANISM

[75] Inventor: Masanao Baba, Takarazuka, Japan

[73] Assignee: Nippon Cable System Inc., Japan

[21] Appl. No.: 753,226

[22] Filed: Dec. 22, 1976

[30] Foreign Application Priority Data

Dec. 24, 1975 Japan ................................ 50-155219

[51] Int. Cl.[2] ............................................ B60K 41/02

[52] U.S. Cl. ................................ 192/.096; 74/480 B; 74/877

[58] Field of Search ............................ 192/.096, .098; 74/480 R, 480 B, 876–878

[56] References Cited

U.S. PATENT DOCUMENTS

| | | | |
|---|---|---|---|
| 2,759,578 | 8/1956 | Manzolillo | 192/.098 |
| 2,884,109 | 4/1959 | Morse | 74/480 B |
| 2,907,421 | 10/1959 | Morse et al. | 192/.096 |
| 2,919,772 | 1/1960 | Morse | 192/.096 |
| 2,935,891 | 5/1960 | Morse | 192/.096 |
| 2,957,352 | 10/1960 | Pierce | 74/480 B |
| 2,960,199 | 11/1960 | Morse | 192/.098 |
| 2,966,969 | 1/1961 | Morse | 192/.098 |
| 2,971,618 | 2/1961 | Morse | 192/.098 |
| 2,973,069 | 2/1961 | Morse | 192/.096 |
| 2,987,152 | 6/1961 | Morse | 192/.098 |
| 3,023,869 | 3/1962 | Morse | 192/.096 |
| 3,130,598 | 4/1964 | Burnham | 192/.096 |
| 3,134,269 | 5/1964 | Shimanckas | 192/.096 |
| 3,741,045 | 6/1973 | Kobayashi | 192/.096 |
| 3,858,699 | 1/1975 | Comstedt | 192/.098 |

*Primary Examiner*—Ronald C. Capossela
*Attorney, Agent, or Firm*—Armstrong, Nikaido, Marmelstein & Kubovcik

[57] ABSTRACT

A control mechanism comprising a lever, a housing member, an axle journaled in the housing, a throttle operating means turnable by the lever and secured to the axle, gear means rotatable by the throttle operating means, a clutch arm fixed on the gear means, a throttle cable operable by the throttle operating means and a clutch cable operable by the clutch arm.

Control mechanism adapted to operate both the clutch and throttle of engine by a single main lever. The mechanism assures that the throttle is held out of operation until the clutch is completely shifted, while the clutch is held in its shifted position during the operation of the throttle.

5 Claims, 15 Drawing Figures

CONTROL MECHANISM

BACKGROUND OF THE INVENTION

This invention relates to a novel control mechanism, and more particularly to a control mechanism for controlling both the clutch and throttle of marine engine by a single lever.

Control mechanism of the type employing a single lever needs to be readily operable free from troubles even by unskilled persons and therefore must fulfill the essential requirements of being so adapted that a throttle is held out of operation until a clutch of engine is completely shifted and having a construction by which the clutch is always held in the shifted position thereof during the operation of the throttle. Further, cheapness and compactness in size are another essential requirements in addition to the security, durability and operability in case of applying it for engine of comparatively small power, such as motorboat engine.

With reference to known control mechanism of the type, the inventor of the present invention found another important problem to be dissolved which results from the clutch mechanism of engine per se.

The clutch of engine of many types, generally, are constructed in such a manner that the shifting thereof is performed by virtue of meshing and releasing engagement between the helical gears contained therein. And the gears are apt to produce a pulling or pushing force which originates from the tendency of the gears of being separated each other, and the force is applied on the clutch arm of the control mechanism through a connecting device such as a clutch cable during and even after the shifting engagement thereof.

On the other hand, in the known control mechanisms previously proposed such as those disclosed in U.S. Ser. Nos. 2,907,421, 2,935,891, 2,973,069, 2,884,109 and 3,858,699, the shifting of the clutch of engine is performed by turning the clutch arm about 30° to 60° in either direction from the neutral position and none of them has a clutch arm which is turnable about 90°.

Therefore, in the previous control mechanisms, the aforesaid force produced at the clutch of engine and transmitted to the clutch arm through the clutch rod, constantly causes the torsional moment to the axle to which the clutch arm is secured, even after the clutch is fully shifted and held in the shifted positions thereof, as will be evident as the discription proceeds. The torsional moment often causes a locking member which is employed for holding the clutch in its shifted positions during the operation of the throttle and is fixed on the axle, to indiscriminately impinge against an opposing locking member and to thereby produce a noise, and results in greater stress on the both locking member with subsequently wear and it consequently shortens the lifetime or durability thereof.

Further, in the previous control mechanisms provided with a clutch arm which is turnable only about 30° to 60° since the necessary torque for rotating the lever varies suddenly when the clutch arm is locked against turning by virtue of the locking engagement between the two aforesaid locking members (or in other words, since the clutch arm is in halt in the shifted position and therefore the torsional moment applied constantly on the clutch arm comes not so as to affect the lever instantly any more), the feeling of operation for the control mechanism is deteriorated.

What is worse still, when returning the lever which is further rotated beyond the shifted position of clutch toward the neutral position, a serious shock load is produced thereupon, since the both aforesaid locking members come into contact with each other prior to the disengaging therebetween and prior to the rotation of the axle which is locked against rotation at the shifted position and on which the torsional moment is applied constantly. Additionally, after that, the aforesaid variation of torque for operating the lever occurs again.

With respect to the shock load, it should be reduced to minimum, since the shock load introduces an unwanted shock to the operator, in addition to the useful shock for indicating him the shifted positions of clutch by feel of frictional engagement of the suitable means which may be preferably composed of a spring-biased ball detent and a recesses.

These two shocks, which are so called two-step-shocks are quite unfavorable for the operator, since they sometimes make him misunderstand the shifting position of the clutch of engine.

And further the strength of unwanted shock is increased with the aforesaid wearing of the locking members, owing to the force applied constantly thereon through the clutch arm in the previous control mechanism.

In the control mechanism of the present invention, since the clutch arm is so constructed that it is turnable about 90° in either direction from the neutral position and therefore the clutch rod connected to the clutch arm and the clutch arm pass near the center of the axle when the clutch is shifted in alternate positions, the aforesaid force produced at the clutch of engine does not apply any torsional moment on the axle. Therefore, the axle which is in the shifted position is turnable smoothly without employing any additional torque and without producing any variation in torque for rotation of clutch arm. Therefore, the excellent effects below described are obtainable in the control mechanism in the invention.

(1) The operation for shifting the clutch is performed quite smoothly, even when returning the lever which is turned beyond the shifted positions toward the neutral position.

(2) The locking members which are in contact with each other for holding the clutch in its shifted positions have a long durability, since the stress therein applied when they are in contact relation and the wearing thereof are extremly small.

(3) When returning the level turned beyond the shifted positions toward the neutral position, any unfavorable or unwanted shock is never produced thereupon, since any torsional moment is not applied on the axle at the shifted positions and the axle is turnable softly without employing any additional torque therefor, and consequently the locking members come into contact each other without producing a shock load.

Further, unexpected excellent features are also obtainable.

(4) The control mechanism of the present invention can be formed in small-sized, since the clutch arm is turnable about 90° in either direction from the neutral position (about 180° in all total) and therefore the radial distance of the clutch arm which is necessary for shifting the clutch of engine can be reduced to minimum.

(5) The inner wire of the clutch cable of the control mechanism of the present invention practically does not move longitudinally at the end period of the shifting of clutch, since the clutch cable passes near the center of the axle and the swivel connection which is pivoted at the end of the clutch arm undergoes a circular arc motion. Consequently, the inner wire of the cable is not substantially pulled lengthwise after the accomplishment of shifting of clutch and is not applied any excessive force thereupon and therefore a trouble such as breaking of the wire is effectively avoidable.

OBJECTS OF THE INVENTION

It is an object of the present invention to provide a novel and improved control mechanism for controlling the operation of both clutch and throttle of engine by a single main lever.

Another object of the invention is to provide a control mechanism which assures that a throttle is held out of operation until a clutch is completely shifted, whilst the clutch is held in the shifted positions thereof during the operation of the throttle.

Further object of the invention is to provide a control mechanism which is very simple in construction, small-sized, operable free from any trouble and economical in manufacturing.

Still further object of the present invention is to provide a control mechanism which can effectively eliminate the unfavorable influence of the force produced at the clutch of engine and transmitted thereto through the clutch rod.

Other objects and advantages of the invention will become apparent from the following description of embodiments with reference to the accompanying drawings.

DETAILED DESCRIPTION

Figure 1:
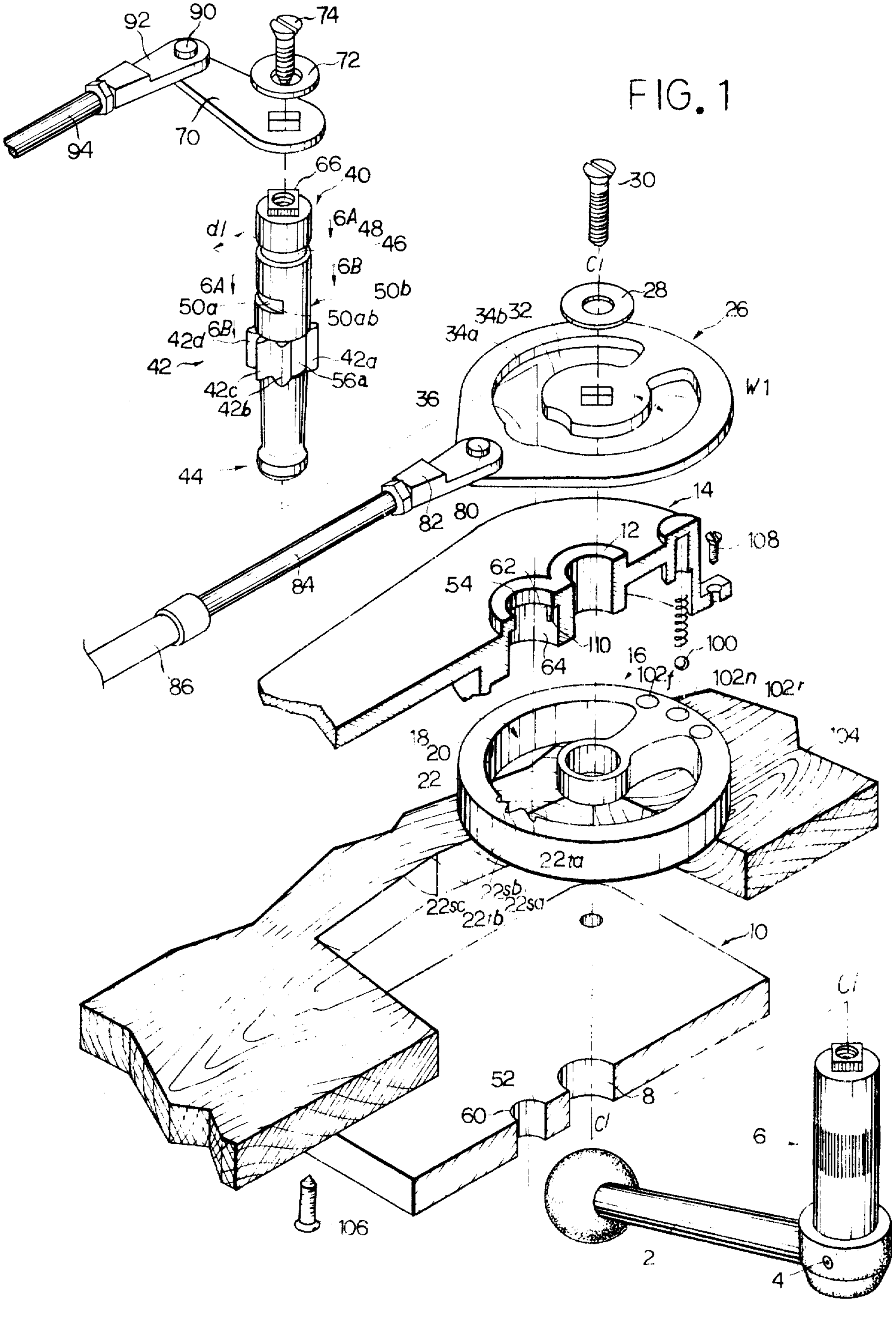
FIG. 1 is an exploded, perspective view showing the components of an embodiment of the present invention.
Figure 2:
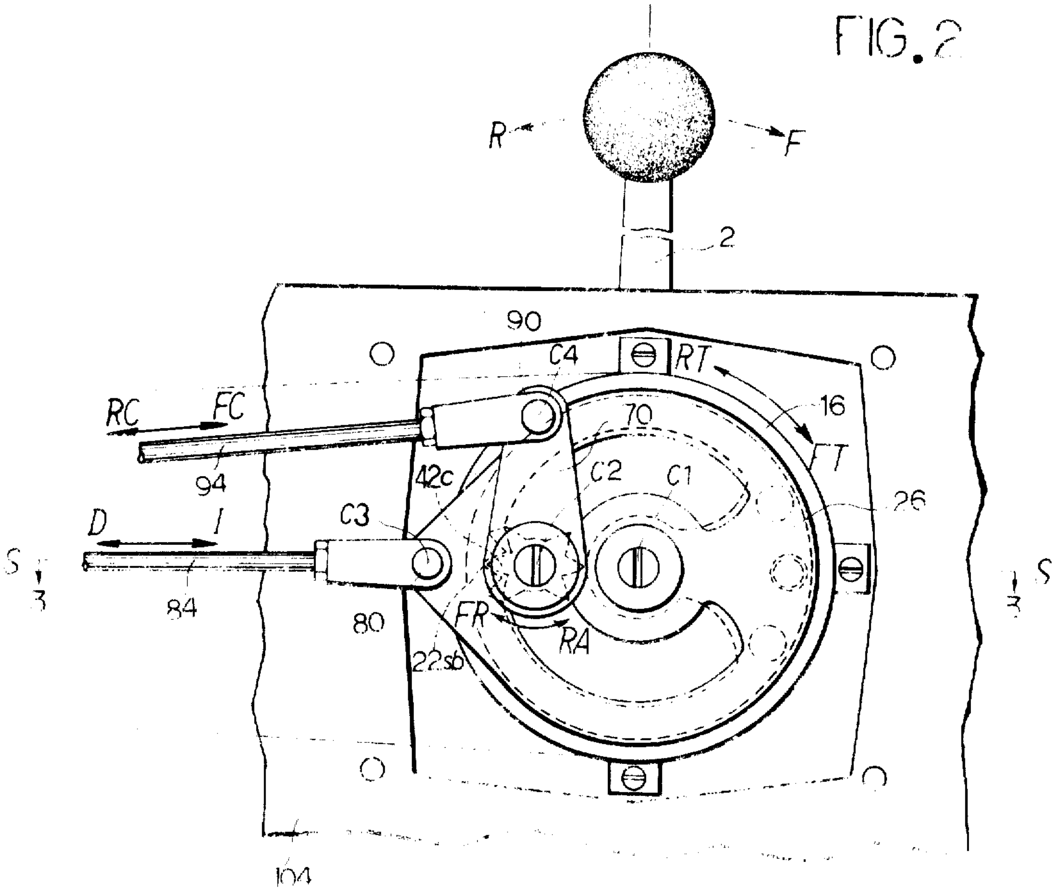
FIG. 2 is a rear side elevation of the embodiment, with the lever in neutral position.
Figure 3:
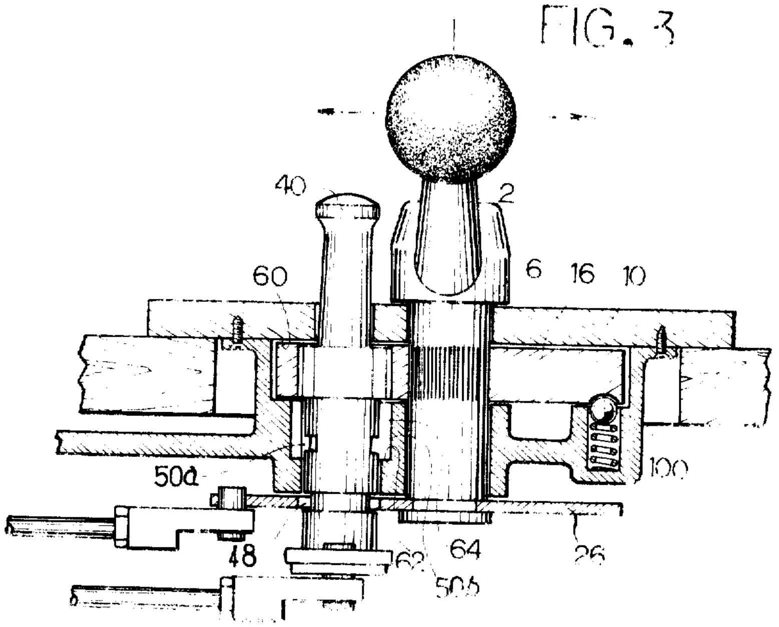
FIG. 3 is a sectional view, generally along line 3—3 of FIG. 2.

With reference to FIGS. 1, 2 and 3, a lever 2 is fastened by a screw 4 to an axle 6 which is rotatably received in a bearing bore 8 of a cover plate 10 and a bearing bore 12 of a casing 14. A throttle operating disk 16 which is secured to the axle 6 is formed with a circular arc apertured portion 18 having a circular arc surface 20 extending about the center C1 of the axle 6 and a gear portion 22 formed in the middle of the surface 20. The tops of the teeth 22*ta* and 22*tb* of the gear portion 22 are suitably higher than the circular arc surface 20.

The end of the axle 6 is squared and an engaging disk 26 is held on the squared end of the axle 6 by a washer 28 and a screw 30. The engaging disk 26 is also formed with a circular arc apertured portion 32 centered about the center C1 of the axle 6. The circular arc apertured portion 32 has circular arc surfaces 34*a* and 34*b* and a circular arc cutout portion 36 formed in the middle of the circular arc surfaces 34*a* and 34*b*.

A gear means 40 which is parallel to the axle 6 comprises a gear portion 42, a knob portion 44, and a cylindrical portion 46 having an annular groove 48 and a pair of slots 50*a* and 50*b*. The gear means 40 is rotatably received in a bearing bore 52 in the cover plate 10 and a bearing bore 54 in the casing 14 through the apertured portions 18 and 32.

Figure 4A:
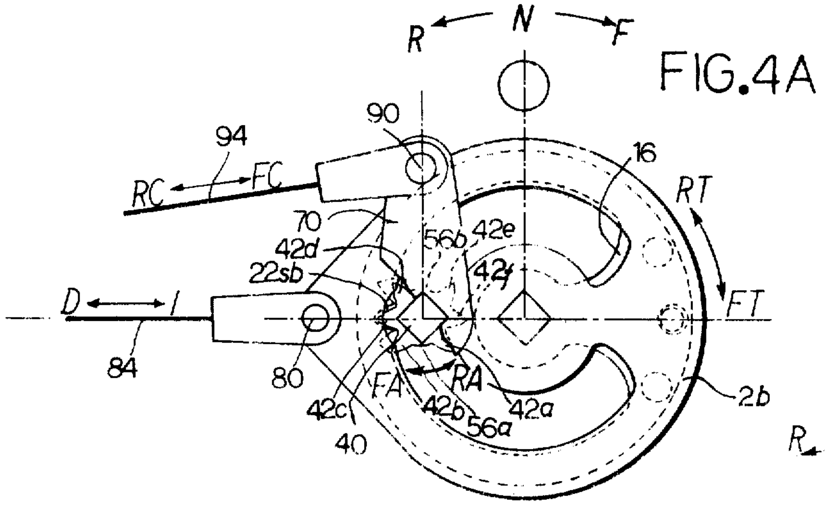
FIG. 4A is a partially cutaway fragmentary schematic elevation with the lever in neutral position.
Figure 4B:
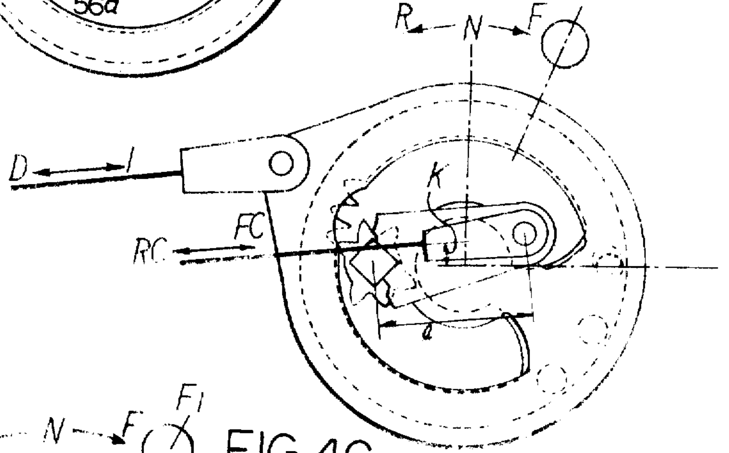
FIGS. 4B, 4C, 4D and 4E are partially cutaway fragmentary schematic elevations with the lever in forward position.
Figure 4C:
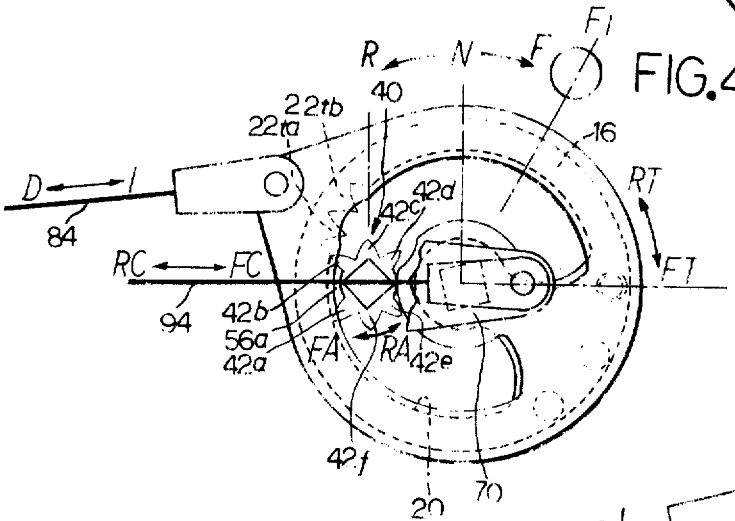
Figure 4D:
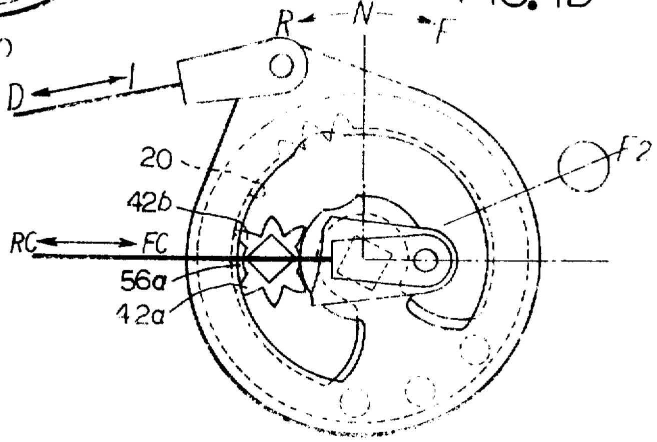

The gear portion 42 of the gear means 40 has several teeth 42*a* to 42*f* and two untoothed portions 56*a* and 56*b*, as best shown in FIG. 4C.

The gear means 40 is axially displaceable until the gear portion 42 comes into contact with an inner surface 60 of the cover plate 10 and with an inner surface 62 of the hole 64 in the casing 14 respectively. The gear portion 42 is meshable with the gear portion 22 of the throttle operating disk 18 and the gear portion 42 of the gear means 40 is so designed that the gear means 40 is turnable about 90° in either direction from a neutral position with the operation of the throttle operating disk 16.

The knob portion 44 of the gear means 40 may be provided with a knob in order to facilitate grasping the gear means 40 to move it axially.

The gear means 40 has a squared portion 66 on its end on which a clutch arm 70 is nonrotatably mounted by a washer 72 and screw 74.

Figure 6A:
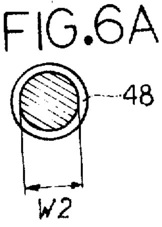
FIG. 6A is a sectional view as on line 6A—6A of FIG. 1, FIGS. 6B, 6C and 6D are sectional views, as on line 6B—6B of FIG. 1
Figure 6B:
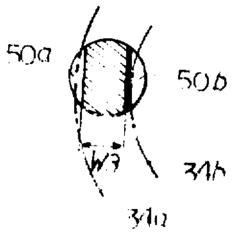

The cylindrical portion 46 of the gear means 40 is passable through the engaging disk 26 only at the circular arc cutout portion 36 thereof since the width W1 between the circular surfaces 34*a* and 34*b* is narrower than the diameter d1 of the cylindrical portion 4*b*. On the other hand the annular groove 48 and slots 50*a* and 50*b* are slidable between the circular surfaces 34*a* and 34*b*, since the width W1 is formed slightly wider than the distances W2 and W3 of the annular groove 48 and slots 50*a* and 50*b* (shown in FIGS. 6A to 6D). And when the gear means 40 is in contact with the engaging disk 26 at the slots 50*a* and 50*b*, the gear means 40 comes to be locked against turning since the bottoms 50*ab* and 50*bb* of the slots 50*a* and 50*b* is in sliding contact with the circular surfaces 34*a* and 34*b* of the circular arc apertured portion 32, whereby the clutch arm 70 is also locked against turning, as partially shown in FIG. 6B (the circular surfaces 34*a* and 34*b* are shown in phanton line in this Figure).

Figure 6C:
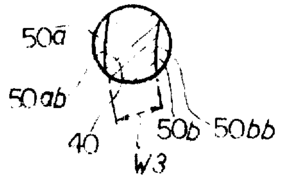

Preferably, the bottoms 50*ab* and 50*bb* of the slots 50*a* and 50*b* may be formed in a shape of circular arcs as shown in FIG. 6C, the radiuses of which are approximately same as those of circular surfaces 34*a* and 34*b* with which the bottoms of the slots 34*a* and 34*b* are in contact.

Figure 6D:
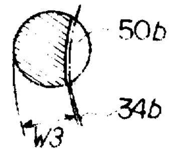

If desired, one of the combinations comprising the slot 50*a* and circular surface 34 *a* or the slot 50*b* and circular surface 34*b* may be removable as readily understandable by those skilled in the art and as shown in FIG. 6D.

A pin 80 is fixed on a suitable portion of the engaging disk 26. A swivel connection 82 connected to a throttle rod 84 which telescopes in a sleeve 86 and is preferably connected to an inner wire of a cable (not shown) is pivoted to the pin 80. Instead of the throttle rod 84, inner wire of cable is directly connectable to the swivel in necessary cases, and therefore, the term "rod" is to be interpreted hereinafter as including a suitable inner wire of cable. Similarly the clutch arm 70 is provided at a suitable portion with a pin 90 to which a swivel connection 92 secured to a clutch rod 94 is pivoted.

The pin 80, in the preferable embodiment of the present invention, is so positioned that it is on a centerline S-S (shown in FIG. 2), when the lever 2 is in neutral position N. When turned in the direction F or R, the lever 2 rotates the engaging disk 20 in a direction FT or RT, whereby the throttle rod 84 is pulled in a direction I. When the lever 2 is in neutral position N, the pin 90, in this preferable embodiment, is positioned on a line extending from the center C2 of the gear means 40 approximately at right angle to the centerline S-S, and therefore, the centerline of the clutch rod 94 is approximately at right angle to the line connecting the center C2 of the gear means 40 and the center C4 of the pin 90 (shown in FIG. 2). Further, when the lever 2 is in position N, the central gear **42*c* of the gear portion 42 of the gear means 40 is engaging with the central space 22*sb* of the gear portion 22 of the throttle operation disk 16. The rotation of the clutch arm 70 in a direction FA or RA, pulls or pushes the clutch rod 94** in a direction FC or RC, as shown in FIGS. 4B to 4F.

A spring-biased ball detect 100 is mounted in the inner side of the casing 14 for frictionally engaging with concave recesses **102*f*, 102*n* and 102*r* formed in the opposing side of throttle operating disk 10**, with corresponding to forward, neutral and reverse positions of the clutch of engine respectively.

The cover plate 10 may be mounted on the rear side of mount plate 104 in a boat by suitable mounting bolts 106 and the casing 14 is secured to the cover plate 10 by means of screws 108.

In operation, when the lever 2 in neutral position N is turned a predetermined angle F1 toward the direction F, the throttle operating disk 16 turns in the same direction as shown in FIG. 4C. The gear 42 of the gear means 40 meshing with the gear portion 22 of the throttle operating disk 16 rotates in a direction FA about 90°, with the result that the teeth **42*a* and 42*b* on the opposite sides of the untoothed portion 56*a* come into contact with the circular arc surface 20 defining the circular arc apertured portion 18, whereupon the gear means 40** is locked against further rotation.

With the rotation of the gear means 40 in the direction FA, the clutch arm 70 secured thereto rotates in the same direction and the same angle, as a result the clutch arm 70 comes to be located approximately on the centerline S-S and being locked thereat.

Further, with the rotation of the throttle operating disk 16, the pin 80 which is located on the centerline S-S when the lever 2 is in position N undergoes a circular arc motion, thereby slightly pulling the throttle rod 84 in the direction I. On the other hand, the clutch arm 70 rotates in the direction FA by a greater amount than the throttle operating disk 16, that is about 90° as described before, with the result that the pin 90 mounted on the clutch arm 70 and located on a line extending from the center C2 at right angle to the centerline S-S when the lever 2 is in position N pulls the clutch rod 94 by a large amount toward the direction FC. The clutch rod 94 shifts the engine clutch (not shown) for example to forward position.

The lever 2, when turned in the direction F further to position F2 as shown in FIG. 4C, rotates the throttle operating disk 16 and the engaging disk 26 further in the direction FT. The engaging disk 26 largely pulls the throttle rod 84 in the direction I to advance the throttle of engine to a large extent and to thereby drive the boat forward at a high speed.

On the other hand, despite the turning of the lever 2 from position F1 toward the direction F, the clutch arm 70 remains against turning, since the gears **42*a* and 42*b* are sliding along the circular surface 20 and are prevented from rotation. Thus the clutch rod 94** maintains the clutch in its shifted position.

Until the clutch has been completely shifted by the clutch rod 94, throttle rod 84 is also pulled in the direction I slightly. Practically, although such initial operation of the throttle is not always objectionable. If desired, suitable means for preventing the operation of throttle at the initial stage may be provided and some of which are already disclosed in U.S. Patent Application No. 557,963 filed by the inventor of the present invention now U.S. Pat. No. 4,034,835.

The lever in position F2, when returned toward position N, rotates the throttle operating disk 16 in the direction RT, whereby the throttle rod 84 is pushed toward the direction D to reverse the throttle. When the lever 2 returns to near the position F1, the gear **42*b* on the gear means 40 comes into contact with the top of the gear 22*ta* of the throttle operating disk 16 (shown in FIG. 4E) which is suitably projected from the circular arc surface 20, as described before, and comes into meshing engagement with the gear portion 22 thereof. Turning of the lever 2 further backward position N causes the gears means 40 to rotate in the direction RA, thereby turning the clutch arm 70 in the same direction. The clutch arm 70 pushes the clutch rod 94** toward the direction RC, shifting the clutch to neutral position N. These parts are now in the position shown in FIG. 4A.

With the rotation of the lever 2 in the direction R, the throttle operating disk 16 turns in the direction RT and rotates the gear portion 42 of the gear means 40 in the direction RA provided with the clutch arm 70, with pushing the clutch rod 94 in the direction RC. The rod 94 shifts the clutch for example to reverse position. In that case also, the gear portion 42 on the gear means 40 meshing with the gear portion 22 of the throttle operating disk 16 rotates about 90°-arc, as described earlier, with the result that the teeth **42*d* and 42*e* on the opposite side of the untoothed portion 56*b* come into contact with the circular arc surface 20, whereupon the gear 42 is locked against further rotation. Consequently, the clutch arm 70 which is secured to the gear means 40** and rotated in the same direction and the same angle comes to be located approximately on the centerline S-S and being locked thereat, as shown in FIG. 4F.

When the lever 2 turned further in the direction R, the throttle operating disk 16 and the engaging disk 26 are rotated therewith, and the throttle rod 84 is pulled in the direction I to advance the throttle to a large extent and to thereby drive the boat reverse.

On the other hand, in spite of the turning of the lever 2 further toward the direction R, the clutch arm 70 remains against turning, since the gear 42 of the gear means is locked against turning owing to the locking engagement between the teeth **42*d*, 42*c* and the circular surface 20. Thus the clutch rod 94 of the clutch cable 96** maintains the clutch in shifted position.

When the lever 2 is returned toward position N, the throttle operting disk 16 is rotated in the direction FT, whereby the throttle rod 84 is pushed toward the direction D to reverse the throttle. During the reverse of lever 2 toward the neutral position N, the gear 42 on the gear means 40 comes into contact with the top of the gear **22*tb* of the throttle operating disk 16 and comes into meshing engagement with the gear portion 22 of the throttle operating disk 16, and as a result, the gear 42 rotates in the direction FA with the clutch arm 70. The arm 70 pulls the clutch rod 94** toward the direction FC, shifting the clutch to neutral position N. These parts are also now in the position shown in FIG. 4A.

The arrangement of the spring-biased ball detent 100 and the concave recesses **102*f*, 102*n* and 102*r*** suitably indicates to the operator by feel the positions at which the clutch is fully engaged or is neutralized.

Figure 5:
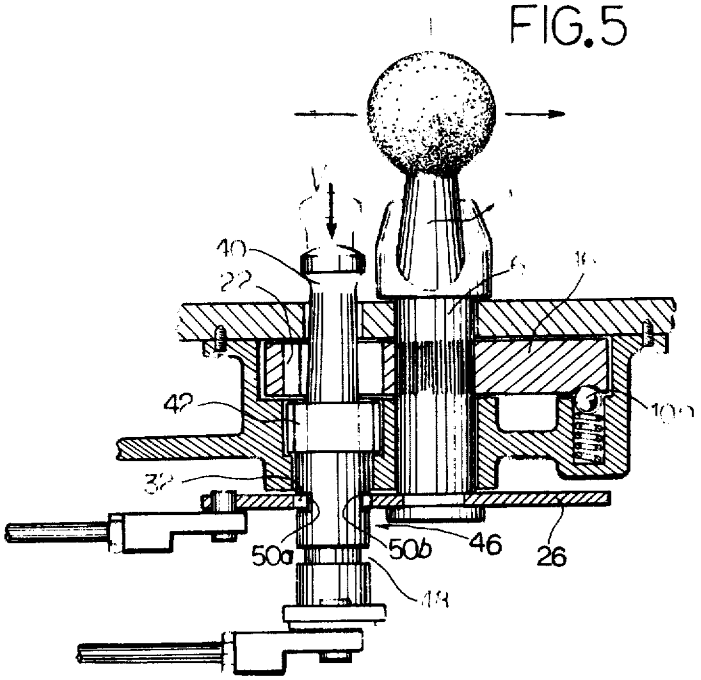
FIG. 5 is a sectional view, with the gear means in axially shifted position, generally along line 3—3 of FIG. 2.

To warm up the engine, the gear means 40 is pushed in a directin V as shown in FIG. 5, when it is in neutral position N. At the same time, the gear 42 is disengaged from the gear portion 22 of the throttle operating disk 16 and the slots **50*a* and 50*b* come into opposing relation with the circular arc apertured portion 32 of the engaging disk 26**.

Since the cylindrical portion 46 on the gear means 40 can pass through only at the circular cutout portion 36 of the engaging disk 26, the gear means 40 is pushable in the direction V only when the lever 2 is in neutral position N. When the throttle operating disk 16 is freed from the gear portion 42 by pushing the gear means 40 in the direction V, the throttle rod 84 is movable independently on the clutch arm 70, by turning the lever 2 in the direction F or R and consequently rotating the engaging disk 26 in the direction FT or RT.

As described earlier, since the bottom **50*ab* of the slot 50*a* and the bottom 50*bb* of the slot 50*b* are in sliding contact with the circular surfaces 34*a* and 34*b* respectively, the gear means 40 and clutch arm 70 are held out of rotation. Thus during warming up, the clutch of engine is retained in locked position. Besides, since the width W1 (shown in FIG. 1) between the circular surfaces 34*a* and 34*b* of the circular arc apertured portion 32 is smaller than the diameter d1 of the cylindrical portion 46 of the gear means 40, it is impossible to shift the gear means 40 during the operation of the lever 2, which results in providing a safety control mechanism. When the gear means 40 is pushed out after the throttle operating disk 16 being returned to neutral position, the gear portion 42 of the gear means 40 is meshable with the gear portion 22 of the throttle operating disk 16** always properly. The procedure above not only is employed for warming up the engine but also is useful for the operation of a generator or the like loaded in the boat.

If desired, the housing means and gear means may be provided with suitable means for frictional engaging therebetween.

One of the two slots **50*a* and 50*b* as well as one of circular surfaces 34*a* and 34*b*** paired thereto are removal in necessary case, as already described and as shown in FIG. 6D.

In addition to the locking arrangement comprising aforesaid slots **50*a* and/or 50*b* and the circular surfaces 34*a* and/or 34*b*, the casing 14 preferably may be formed with suitable projections 110 in the hole 64 (shown in FIG. 1 partially) which can engage with the gear portion 42 of the gear means 40** axially shifted, for preventing the rotation thereof.

Figure 7:
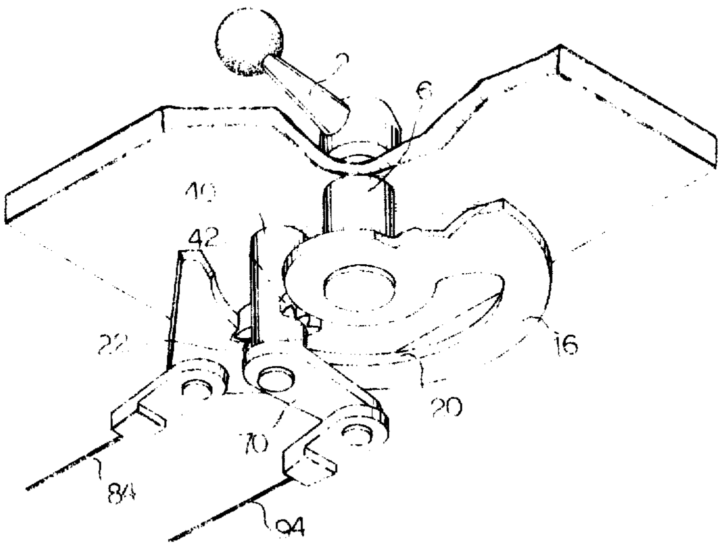
FIG. 7 is a perspective view showing another embodiment of the invention.

Further, in the case where the operation for warming up the engine is unnecessary, the engaging disk 26 is removal as shown in FIG. 7. The throttle rod 84 may be supported on the throttle operating disk 16 in this embodiment.

As will be apparent from the foregoing description, the embodiments of the present invention can fully fulfill the necessary functions including operability, compactness, cheapness, security and durability thereof which are required in control mechanisms of the type.

Further it is evident that, in the control mechanism of the present invention which is so constructed that the clutch arm is turnable about 90° in either direction from the neutral position and as a result, the clutch arm 70 and the clutch rod 94 pass near the center C1 of the axle 6 when the clutch is shifted in alternate positions, and therefore force f which is transmitted to the clutch arm 70 through the clutch rod 94 does not cause any torsional moment T ($T = f \times K$) on the axle 6, since the distance K between the center C2 and the clutch (in order to make clear the distance K, it is shown in FIG. 4B which shows the situation just before the accomplishment of locking engagement between the teeth **42*a*, 42*b* and circular surface 20**) is substantially negligible.

Therefore, the locking members such as teeth **42*a*, 42*b* and 42*d*, 42*e* and circular surface 20 of the throttle operating disk, in the embodiment of the invention, are not suffered by any unfavorable force and stress, and as a result, the axle is turnable softly without requiring any additional torque, even when the axle 6** is in the shifted positions.

Therefore, excellent results below-described are obtainable by virtue of the aforesaid features in the control mechanism of the present invention.

(1) The lever is turnable quite softly and smoothly even during the returning operation thereof toward the neutral position, since the axle is turnable without producing any variation in torque of the lever.

(2) The locking members which are in contact with each other for holding the clutch in its shifted positions posesses a long life time, since the contact stress applied thereon is negligible and, therefore, the wearing thereof is extremely small.

Figure 4E:
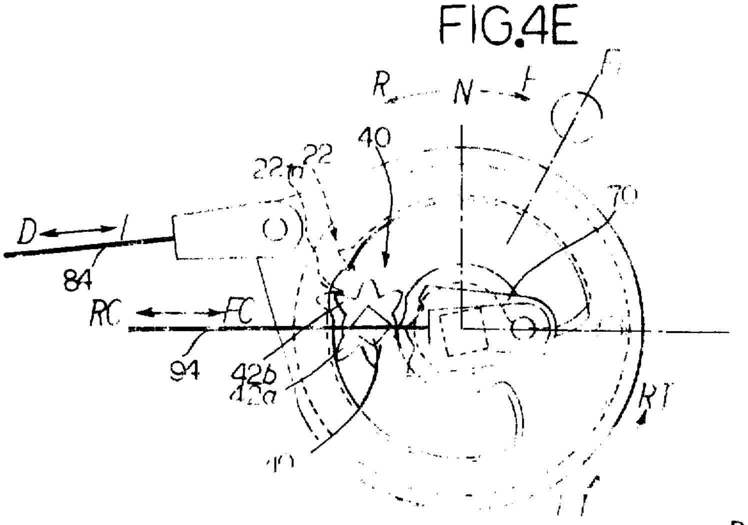
Figure 4F:
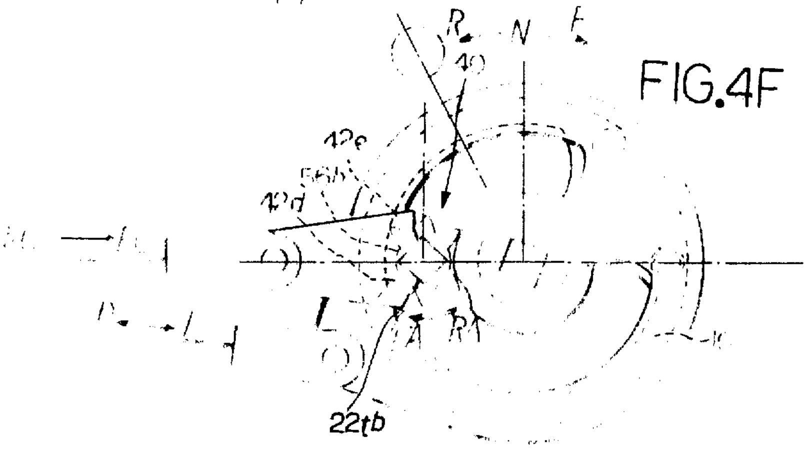
FIG. 4F is a partially cutaway fragmentary schematic elevation with the lever in reverse position.

(3) When returning the lever turned beyond the shifting position toward the neutral position as shown in FIG. 4E, any unfavorable or unwanted shock is not produced, since the torsional moment T is quite small, as described before, and as a result, the gear **42*b* *L* or *42d* of the gear means 40 is meshable with the top of the gear 22*ta* or 22*tb* of the throttle operating disk 16** softly and without producing any unfavorable shock load thereat.

(4) The control mechanism of the present invention can be formed in small-sized, since the clutch arm is turnable about 90° in either direction from the neutral position (about 180° in all total) and, therefore, the radial length 1 (shown in FIG. 4B) of the clutch arm 70 which is necessary for shifting the clutch of engine can be reduced in minimum.

Besides, the shortness in length of the clutch arm 70 can also effectively reduce the aforesaid torsional moment T, since the distance K (shown in FIG. 4B) is decreased in proportion to the length of the clutch arm 70, as is evident by those skilled in the art.

(5) An inner wire of a clutch cable employed for operating the clutch of engine is not elongated substantially at the end period of the shifting of clutch of engine, since the clutch cable passes near the center C2 of the axle 6 and the swivel connection 92 which supports the end of the clutch rod 94 connected to the inner wire of the clutch cable, undergoes a circular arc motion.

Consequently, the inner wire of the cable is not pulled after the accomplishment of shifting the clutch. Therefore, any excessive force is not applied thereupon and as a result, a trouble such as breaking of the wire is effectively avoidable.

With respect to the turning angle of the clutch arm 70, it is explained hereinbefore that the clutch arm is turnable "about 90°" in either direction from the neutral position. However, even when the turning angle of the clutch arm is about 70°, it is evident that the torsional moment T applied on the axle 6 is small and smaller than that in the previous control mechanism, because the distance K (shown in FIG. 4B) is sufficiently small. Therefore the term "about 90°" is should be interpreted as "70° to 90°" in the specification of the present invention.

Although the throttle operating means in the preferable embodiment of the invention comprises two components, that is to say, the throttle operating disk 16 and the engaging disk 26 separated therefrom, the throttle operating disk 16 and the engaging disk 26 preferably may be formed in an unit body or in a form of an integral unit.

As many apparently widely different embodiments of the present invention may be made without departing from the spirit and scope thereof, it is to be understood that the invention is not limited to the specific embodiments thereof except as defined in the appended claims.

What we claim is:

1. A control mechanism for the clutch and throttle of engine comprising:
 - a lever means;
 - a housing means;
 - an axle journaled in said housing means and turnable by said lever means;
 - a throttle operating means comprises a throttle operating disk secured to said axle;
 - said throttle operating disk being formed with a circular arc surface which are centered about the center of said axle;
 - a throttle cable operable by said throttle operating means;
 - a gear means rotatably journaled in said housing means through circular arc apertured portion of the throttle operating disk and provided with a gear portion having an untoothed portion therein meshable with the gear portion of said throttle operating disk,
 - said gear means being rotatable about 90° in either direction from a neutral position with the rotation of said throttle operating means;
 - a clutch arm secured on said gear means; and
 - a clutch rod pivoted to said clutch arm at the outer end thereof;
 - said clutch arm being lockable after the rotation about 90° with the rotation of the throttle operating disk and the throttle operating disk alone being further rotatable.

2. A control mechanism as claimed in claim 1, wherein said gear means is journaled in the housing axially shiftable and has a cylindrical portion formed with an annular groove and a slot;
 - said throttle operating means comprises said throttle operating disk and engaging disk which is secured to said axle;
 - said engaging disk being formed with a circular arc surface centered about the center of said axle with which the annular groove and the slot of the gear means are in sliding contact respectively and a cutout portion which permits passage of the cylindrical portion of the gear means;
 - the gear means being axially shiftable and the engagement between the both gear portions of the throttle operating disk and the gear means is unmeshable, only when the throttle operating means and the clutch arm are in neutral position; and the gear means locked against turning.

3. A control mechanism as claimed in claim 2, wherein said slot of the gear means has a bottom in a shape of circular arc which has approximately same radius as that of the circular arc surface of the engaging disk.

4. A control mechanism as claimed in claim 2, wherein said cylindrical portion of the gear means is provided with only one slot at one side thereof.

5. A control mechanism as claimed in claim 2, wherein said cylindrical portion of the gear means is provided with two slots at opposed sides thereof.

* * * * *